Oct. 27, 1970   D. H. WILLIAMSON   3,536,419
ROTORS
Filed Jan. 30, 1969   3 Sheets-Sheet 1

INVENTOR
DOUGLAS HERBERT WILLIAMSON
By
Cushman, Darby & Cushman
ATTORNEYS

Oct. 27, 1970    D. H. WILLIAMSON    3,536,419
ROTORS
Filed Jan. 30, 1969    3 Sheets-Sheet 2
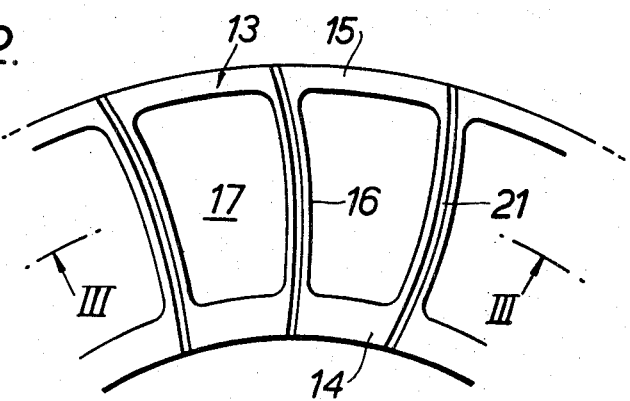
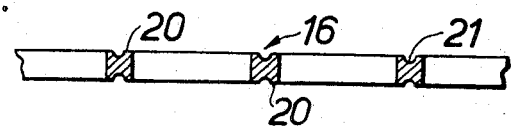
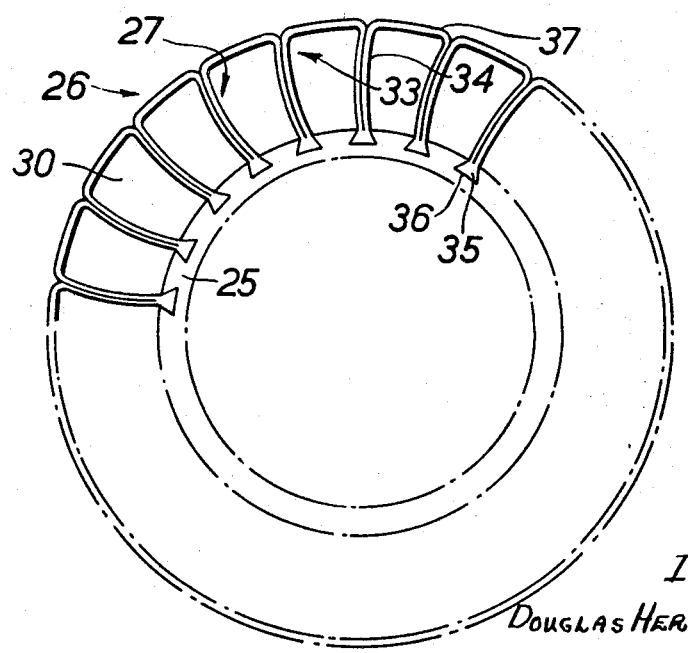
INVENTOR
DOUGLAS HERBERT WILLIAMSON
By
Cushman, Darby & Cushman
ATTORNEYS

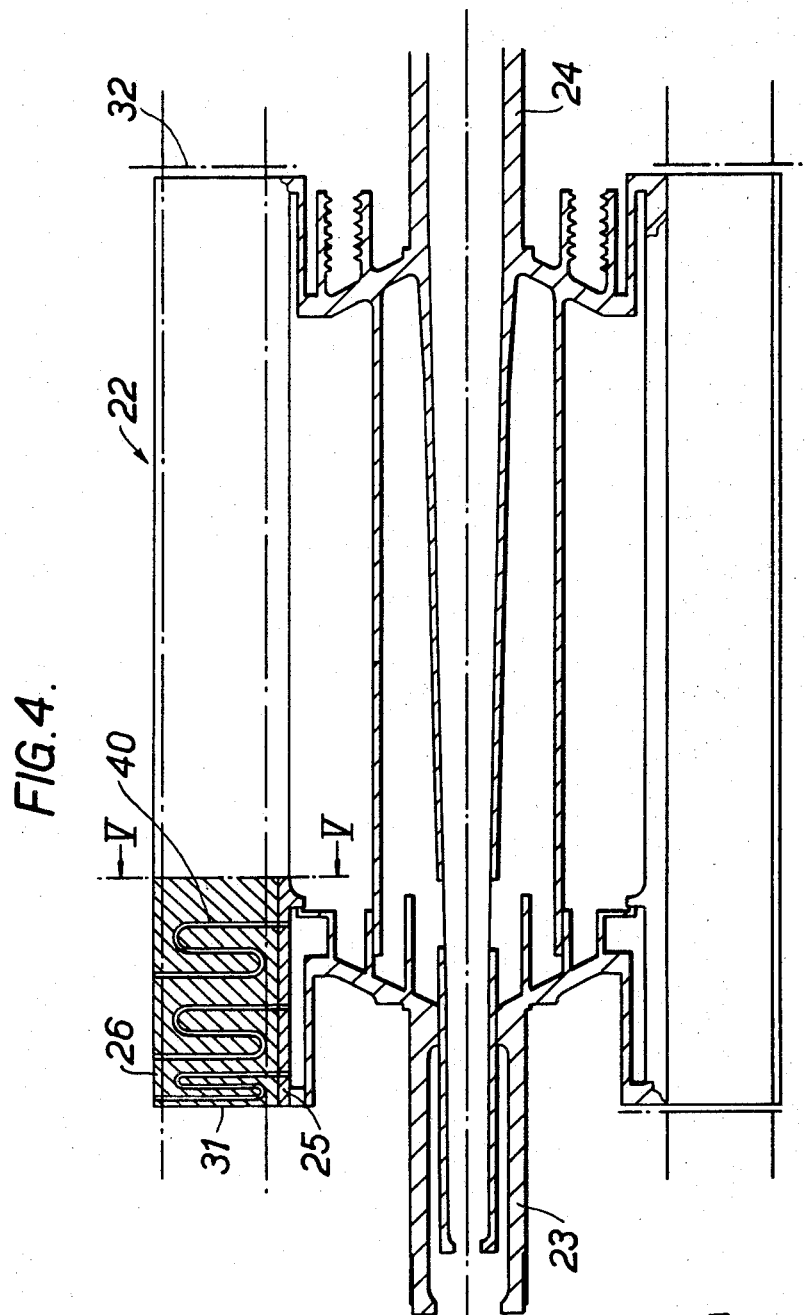

United States Patent Office 3,536,419
Patented Oct. 27, 1970

3,536,419
ROTORS
Douglas Herbert Williamson, Derby, England, assignor to Rolls-Royce Limited, Derby, England, a British company
Filed Jan. 30, 1969, Ser. No. 795,263
Claims priority, application Great Britain, Feb. 16, 1968, 7,721/68
Int. Cl. F04d 19/24, 29/26
U.S. Cl. 417—64          9 Claims

ABSTRACT OF THE DISCLOSURE

A rotor has radially spaced apart inner and outer shrouds between which extend a plurality of angularly spaced apart vanes, each vane being formed of a plurality of vane portions having adjacent surfaces which are secured together and which are formed to provide cooling fluid passages therebetween.

---

Figure 1:
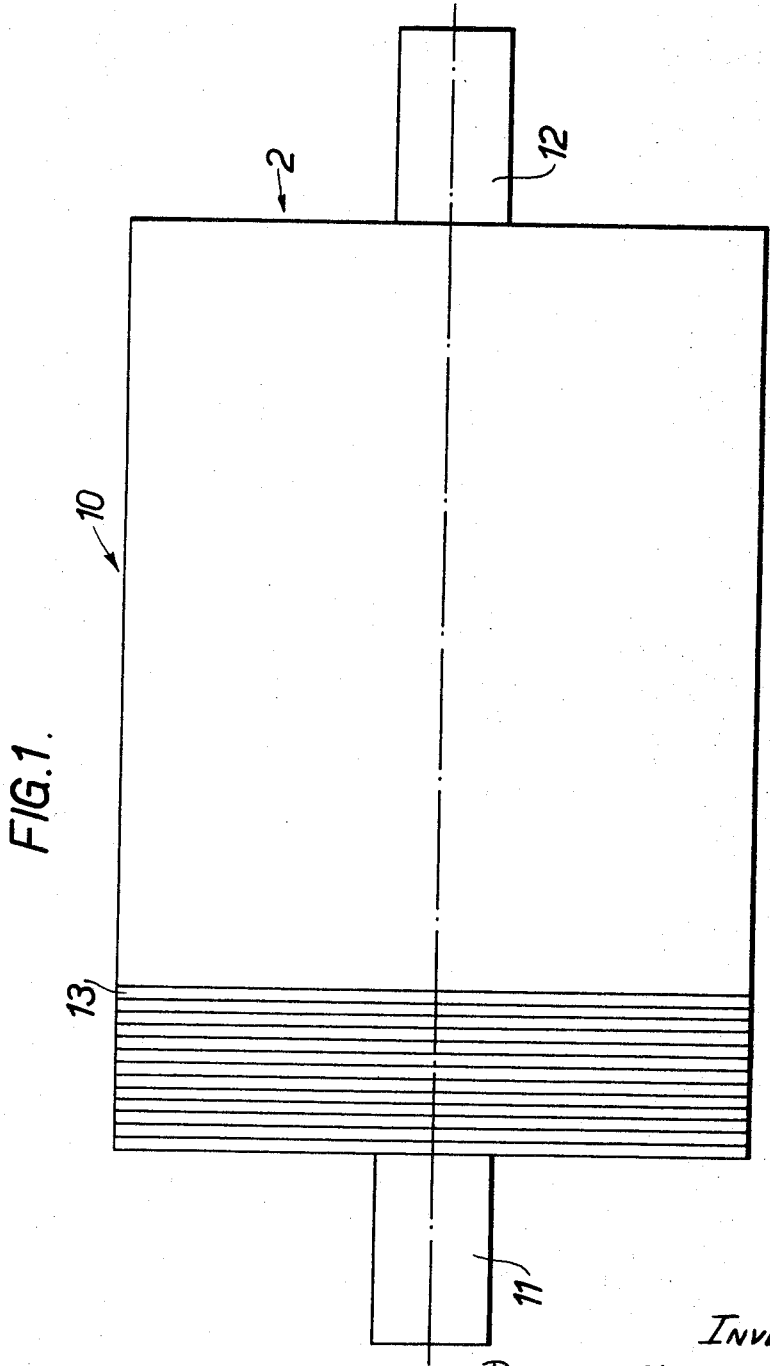

This invention concerns improvements relating to rotors and, although the invention is not so restricted, it is more particularly concerned with a rotor of a rotary pressure exchanger.

According to the present invention, there is provided a rotor having radially spaced apart inner and outer shrouds between which extend a plurality of angularly spaced apart vanes, each vane being formed of a plurality of vane portions having adjacent surfaces which are secured together and which are formed to provide cooling fluid passages therebetween.

The term "vanes" is used in this specification in a broad sense as including blades.

The vanes preferably have flexible portions to accommodate differential thermal expansion between the said shrouds and vanes. Thus, the flexible portions may be curved portions.

Preferably each of the said adjacent surfaces is grooved.

The rotor may be that of a rotary pressure exchanger, the vanes defining with the said shrouds a plurality of angularly spaced apart, axially extending, pressure exchanger cells each of which is open at its axially opposite ends.

The vanes are preferably formed integrally with the outer and/or with the inner shroud.

Thus, at least a part of the rotor may be made up of an assembly of transverse laminations, each of which comprises portions of the said vanes and shrouds.

Alternatively, the rotor may be provided with a plurality of axially extending channel members whose side walls are secured to those of adjacent channel members and constitute said adjacent surfaces. In this case, each channel member may have a portion which forms part of the outer shroud. Moreover, the side walls may have root portions which are received within recesses in a common inner shroud. Additionally, at least some of the cooling fluid passages may be substantially S-shaped.

The invention is illustrated, merely by way of example, in the accompanying drawings, in which:

FIG. 1 is a diagrammatic elevation of one embodiment of a rotor in accordance with the present invention, the said rotor being made up of an assembly of transverse laminations, FIG. 2 is an enlarged broken-away view looking towards one such lamination in the direction of the arrow 2 of FIG. 1, FIG. 3 is an enlarged broken-away developed section taken on the line 3—3 of FIG. 2, FIG. 4 is a sectional elevation of another embodiment of a rotor according to the present invention, and FIG. 5 is a section taken on the line 5—5 of FIG. 4.

In the embodiment of the present invention shown in FIG. 1 to 3, a rotary pressure exchanger has a rotor 10 which is provided with stub shafts 11, 12.

At least a part of the rotor 10, and preferably the whole thereof, is made up of an assembly of transverse laminations 13. As will be seen from FIG. 2, each lamination 13 comprises an inner shroud portion 14 which is radially spaced apart from an outer shroud portion 15, a plurality of angularly spaced apart vane portions 16 extending between and being integral with the shroud portions 13, 14. Each of the vane portions 16 is curved to make it flexible, so as to accommodate differential thermal expansion between the shroud portions 13, 14 and the vane portions 16.

The vane portions 16 define with the shroud portions 13, 14 a plurality of angularly spaced apart axially extending pressure exchanger cells 17 each of which is open at its axially opposite ends.

The individual laminations 13 may be sheet metal stampings, the laminations being bonded to each other, or being mechanically secured together, by means not shown.

As best shown in FIG. 3, each of the vane portions 16 is provided on each of its opposite surfaces 20 (or on only one such surface 20, if so desired) with a cooling air groove 21 which may be supplied with cooling air by means not shown.

Thus it will be appreciated that each vane of the rotor 10 is formed of a plurality of vane portions whose adjacent surfaces 20 are secured together and are formed to provide cooling fluid passages therebetween, which are constituted by the grooves 21.

The cooling air grooves 21 may be readily machined or etched in the surfaces of the laminations 13 prior to their being assembled to form the rotor 10, thus overcoming the difficulty of manufacturing the cooling air grooves 21 in non-straight vanes, e.g. curved, S-shaped or sinuous vanes, or producing long, small diameter holes in thin straight vanes.

In FIGS. 4 and 5 there is shown another embodiment of a rotor in accordance with the invention. In this embodiment, a rotary pressure exchanger has a rotor 22 which is arranged to be driven and/or supported by stub shafts 23, 24. Mounted concentrically about the axis of the rotor 22 are radially spaced apart inner and outer shrouds 25, 26 between which there are a plurality of angularly spaced apart radially extending vanes 27. The vanes 27 define with the shrouds 25, 26 a plurality of angularly spaced apart axially extending pressure exchanger cells 30, each of which is open at its axially opposite ends 31, 32.

The rotor 22 is provided with a plurality of axially extending angularly spaced apart channel members 33 whose side walls 34 are secured to those of adjacent channel members 33. The side walls 34, moreover, have root portions 35 which are received within recesses 36 in the inner shroud 25, the latter being common to all the channel members 34. Each of the channel members 34 has a radially outer portion 37, the portions 37 collectively forming the outer shroud 26.

The adjacent surfaces of the adjacent side walls 34 are bonded or otherwise secured together and at least one surface for both adjacent surfaces are grooved to provide cooling fluid passages 40.

It will be appreciated that because the grooves are in the vane surface it is possible to produce multicurved and S-shaped type of grooves, which can be used to improve the efficient use of the cooling fluid. The multicurved grooves can be quite conveniently produced in the vane surface by imprinting, or by photo-etching, chemical etching, engraving or electro-chemical machining etc.

I claim:
1. A rotor having radially spaced apart inner and outer shrouds and a plurality of angularly spaced apart vanes extending therebetween, said vanes being formed integrally with at least one shroud, each vane being formed of a plurality of vane portions having adjacent surfaces which are secured together and which provide cooling fluid passages therebetween, and said rotor being made up of an assembly of transverse laminations, each of which comprises portions of the said vanes and shrouds.

2. A rotor as claimed in claim 1 in which the vanes have flexible portions to accommodate differential thermal expansion between the said shrouds and vanes.

3. A rotor as claimed in claim 2 in which the flexible portions are curved portions.

4. A rotor as claimed in claim 1 in which each of the said adjacent surfaces is grooved.

5. A rotor as claimed in claim 1 in which the rotor is that of a rotary pressure exchanger, the vanes defining with the said shrouds a plurality of angularly spaced apart, axially extending, pressure exchanger cells each of which is open at its axially opposite ends.

6. A rotor having radially spaced-apart inner and outer shrouds and a plurality of angularly spaced-apart vanes extending therebetween, said vanes being formed integrally with at least one shroud, said vanes and said shrouds defining axially extending channel members whose side walls are secured to those of adjacent channel members, each vane being formed with a plurality of vane portions having adjacent surfaces which are secured together and which provide cooling fluid passages therebetween, the adjacent surfaces being constituted by said side walls, said side walls having root portions received within recesses in said inner shroud.

7. A rotor as claimed in claim 6 in which each channel member has a portion which forms part of the outer shroud.

8. A rotor as claimed in claim 6 in which at least some of the cooling fluid passages are substantially S-shaped.

9. A rotor having radially spaced-apart inner and outer shrouds and a plurality of angularly spaced-apart vanes extending threbetween, said vanes being formed integrally with at least one shroud, said vanes being formed of a plurality of vane portions having adjacent surfaces which are secured together and which provide cooling fluid passages therebetween, said rotor being provided with a plurality of axially extending channel members whose side walls are secured to those of adjacent channel members and constitute the said adjacent surfaces, and at least some of said cooling fluid passages being substantially S-shaped.

References Cited

UNITED STATES PATENTS 1,842,213  1/1932  Smellie _____ 230—117
3,291,379  12/1966  Herger et al. _____ 230—69

ROBERT M. WALKER, Primary Examiner

U.S. Cl. X.R.
416—179